US008403750B2

(12) United States Patent
Bone et al.

(10) Patent No.: US 8,403,750 B2
(45) Date of Patent: Mar. 26, 2013

(54) AUDIO MANAGEMENT IN A WIRELESS WAGERING GAME

(75) Inventors: Robert Bone, Chicago, IL (US); Michael P. Connelly, Elmwood Park, IL (US); Mark B. Gagner, West Chicago, IL (US); Eric M. Pryzby, Skokie, IL (US); Steve Zoloto, Highland Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 835 days.

(21) Appl. No.: 12/298,085

(22) PCT Filed: May 9, 2007

(86) PCT No.: PCT/US2007/011153
§ 371 (c)(1),
(2), (4) Date: Oct. 22, 2008

(87) PCT Pub. No.: WO2007/133566
PCT Pub. Date: Nov. 22, 2007

(65) Prior Publication Data

US 2009/0170597 A1 Jul. 2, 2009

Related U.S. Application Data

(60) Provisional application No. 60/747,023, filed on May 11, 2006.

(51) Int. Cl.
*A63F 13/02* (2006.01)
*A63F 13/00* (2006.01)

(52) U.S. Cl. ................. 463/35; 463/20; 463/40; 463/42

(58) Field of Classification Search .................... 463/20, 463/35, 40, 42
See application file for complete search history.

(56) References Cited

U.S. PATENT DOCUMENTS

| | | | | |
|---|---|---|---|---|
| 6,508,709 | B1 | 1/2003 | Karmarkar | |
| 6,884,162 | B2 | 4/2005 | Raverdy et al. | |
| 2002/0141599 | A1* | 10/2002 | Trajkovic et al. | 381/71.6 |
| 2003/0119575 | A1 | 6/2003 | Centuori et al. | |
| 2003/0224854 | A1 | 12/2003 | Joao | |
| 2004/0162144 | A1* | 8/2004 | Loose et al. | 463/42 |
| 2004/0248642 | A1 | 12/2004 | Rothschild | |

OTHER PUBLICATIONS

International Application Serial No. PCT/US2007/011153, International Preliminary Report on Patentability mailed Jan. 2, 2009, 12 pgs.
International Application Serial No. PCT/US2007/011153, Search Report mailed Jun. 13, 2008, 4 pgs.
International Application Serial No. PCT/US2007/011153, Written Opinion mailed Jun. 13, 2008, 5 pgs.

* cited by examiner

*Primary Examiner* — David L Lewis
*Assistant Examiner* — Robert Mosser
(74) *Attorney, Agent, or Firm* — Schwegman Lundberg & Woessner, P.A.

(57) ABSTRACT

A wireless networked computerized wagering game system comprises a gaming module operable to present a wagering game on which monetary value can be wagered, a wireless network module operable to connect the wagering game system to at least one other networked device via a wireless network connection, and an audio module operable to manage an audio function of the wagering game system. In another embodiment the audio module is operable to present environmental sounds to a wagering game player.

22 Claims, 5 Drawing Sheets

AUDIO MANAGEMENT IN A WIRELESS WAGERING GAME

RELATED APPLICATION

This patent application is a U.S. National Stage Filing under 35 U.S.C. 371 from International Patent Application Serial No. PCT/US2007/011153, filed May 9, 2007, and published on Nov. 22, 2007, as WO 2007/133566 A2, which claims the priority benefit of U.S. Provisional Patent Application Ser. No. 60/747,023 filed May 11, 2006 and entitled "AUDIO MANAGEMENT IN A WIRELESS WAGERING GAME MACHINE", the contents of which are incorporated herein by reference in their entirety.

FIELD OF THE INVENTION

The invention relates generally to computerized wagering game systems, and more specifically to wireless wagering game machines incorporating audio.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. Music and environmental effects are also played through speakers in some wagering game systems to enhance or complement a theme of the wagering game. These sounds typically accompany video presentation of the wagering game on a screen, which itself often includes animation, video, and three-dimensional graphics as part of presentation of the wagering game.

But, as advancement in electronics frees wagering game machine architecture from its traditional large cabinet structure, management of wagering game functions and operation can become a concern. Introduction of wireless wagering game machines has complicated issues relating to ergonomics, security, and other such factors.

SUMMARY

One example embodiment of the invention comprises a wireless networked computerized wagering game system. The system comprises a gaming module operable to present a wagering game on which monetary value can be wagered, a wireless network module operable to connect the wagering game system to at least one other networked device via a wireless network connection, and an audio module operable to manage an audio function of the wagering game system. In another embodiment the audio module is operable to present environmental sounds to a wagering game player.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Various embodiments of the invention seek to provide audio functionality in wireless wagering game machines, and to control the audio configuration of the wagering game machines and audio environment presented via the wagering game machines. In one example embodiment of the invention, a wireless networked computerized wagering game system comprises a gaming module operable to present a wagering game on which monetary value can be wagered, a wireless network module operable to connect the wagering game system to at least one other networked device via a wireless network connection, and an audio module operable to manage the audio function of the wagering game system. In another example embodiment the audio module is operable to present environmental sounds to a wagering game player.

Figure 1:
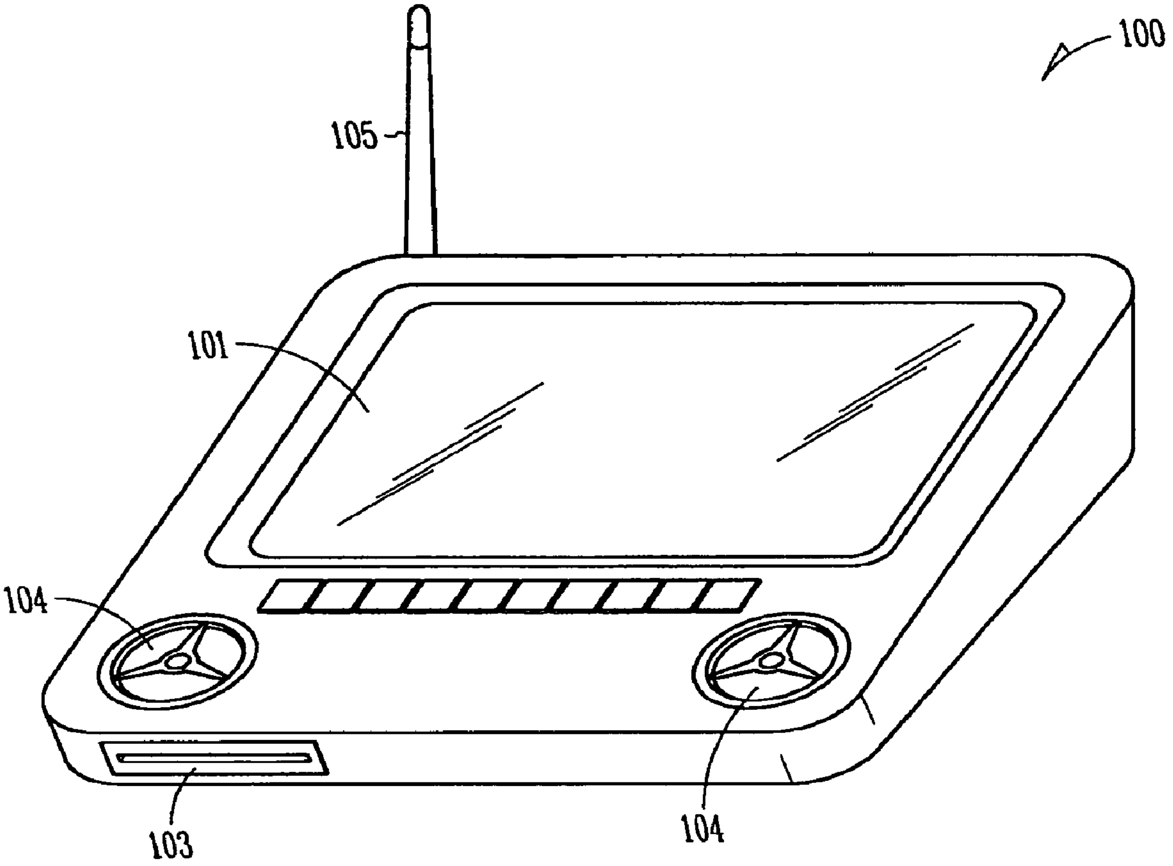
FIG. 1 shows a computerized wagering game machine, as may be used to practice some embodiments of the invention.

FIG. 1 illustrates a portable wireless networked computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a plasma display, an LCD display, a vacuum fluorescent display, a surface conducting electron emitter display, or any other type of display suitable for displaying electronically provided display information. Alternate embodiments of the invention will have other game indicators, such as mechanical indicators, lights, and other indicators.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold'em games. In some further embodiments, a secondary game or bonus game is also available, and other information such as progressive slot information or other community game information is displayed.

The wagering game is played and controlled with inputs such as various buttons or keys 102 or via a touchscreen overlay to video screen 101. The touchscreen is used in some embodiments to display virtual buttons, which can have unique functions in some embodiments, or can duplicate the functions provided by the mechanical buttons 102 in other embodiments. In some alternate examples, other devices are employed to provide other input interfaces to the game player. The player interface components are in this example contained within or mechanically coupled to the wagering game system, but in other embodiments will be located outside the wagering game system enclosure such as by a wired or wireless electronic connection to the wagering game system.

Monetary value is typically wagered on the outcome of the games, such as with tokens, coins, bills, or cards that hold monetary value. The wagered value is conveyed to the machine such as through a secure user identification module interface or a ticket reader 103, and winnings are returned such as via a returned value ticket or a stored value card. Sound is also provided through speakers 104, typically including audio indicators of game play, such as reel spins, credit bang-ups, and environmental or other sound effects or music to provide entertainment consistent with a theme of the computerized wagering game. In some further embodiments, the wagering game machine is coupled to a network via a wireless network antenna 105, and is operable to use its network connection to receive wagering game data, track players and monetary value associated with a player, and to perform other such functions.

In other embodiments, the computerized wagering game system takes one or more other forms, such as various types of stationary or portable wagering game devices, server-based wagering game devices, or a networked wagering game system. These other computerized wagering game system embodiments need not contain all features of the wagering game system of FIG. 1, which does not limit the scope of a computerized wagering game but is provided as an example only.

Figure 2:
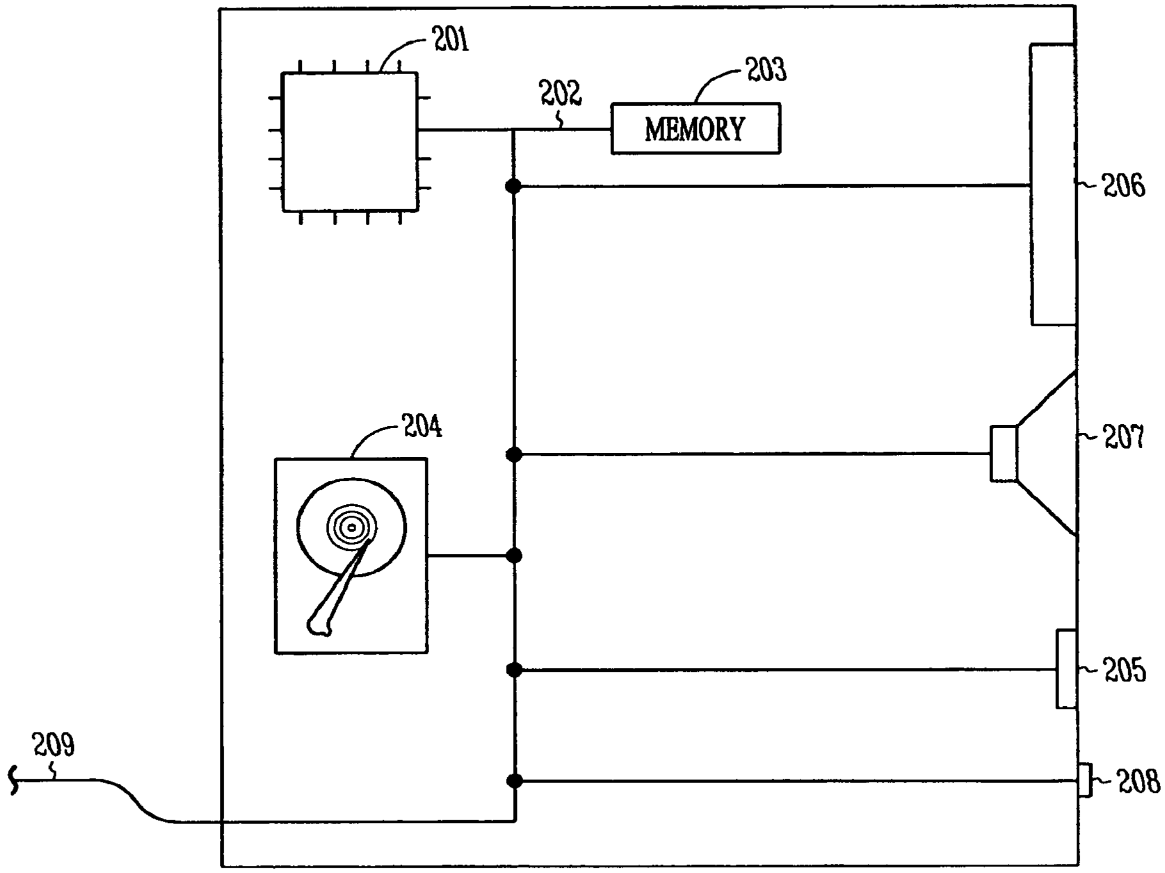
FIG. 2 is a block diagram of a computerized wagering game machine as may be used to practice some embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. These components are located in a portable wagering game machine such as that of FIG. 1 in some embodiments, but can be located in multiple enclosures comprising a wagering game system or outside a wagering game machine cabinet in other embodiments, or in alternate forms such as a stationary or other device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof.

Figure 3:
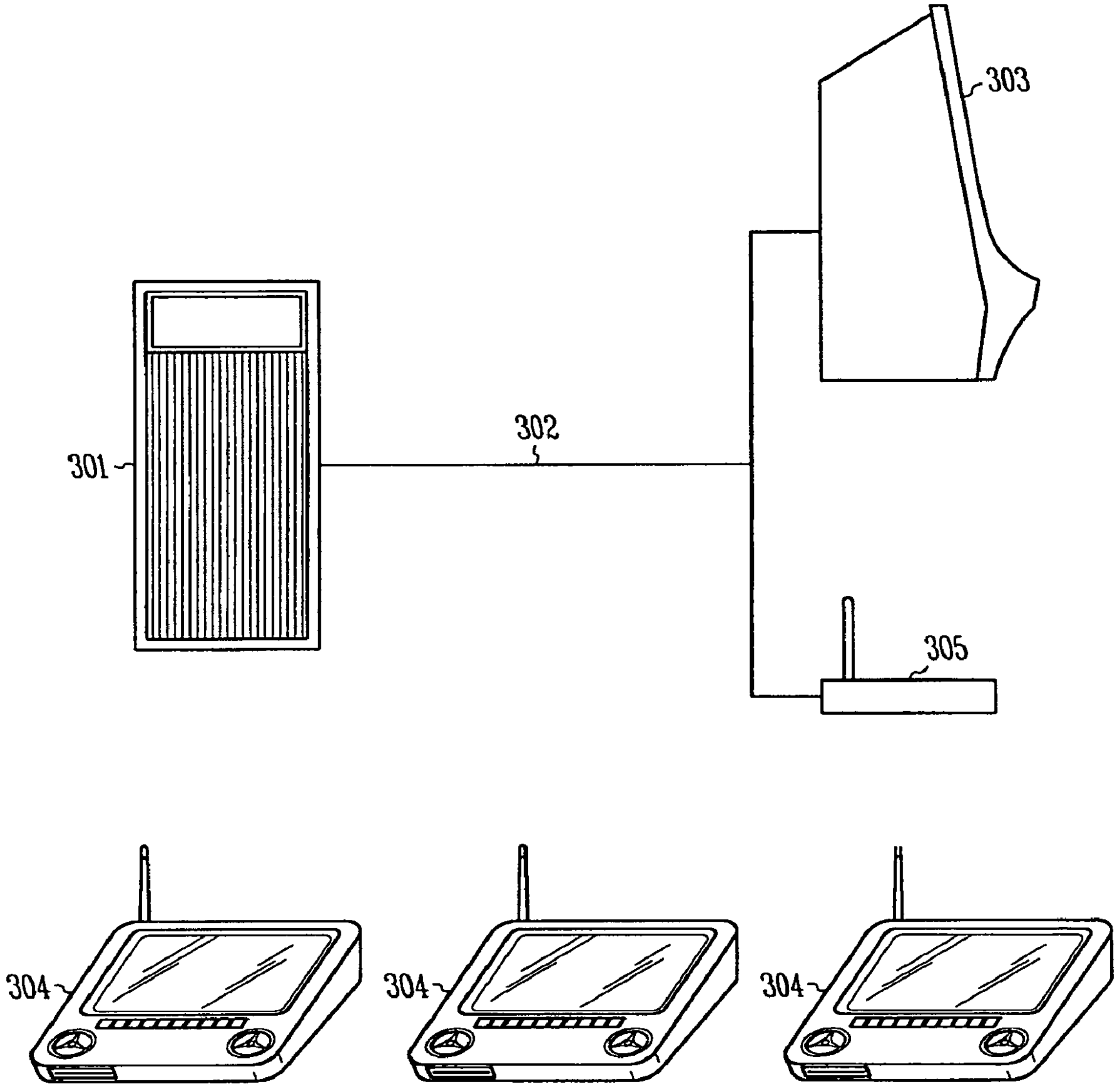
FIG. 3 is a diagram of a wagering game network including stationary and wireless portable wagering game machines coupled to a wagering game server, consistent with some example embodiments of the invention.

FIG. 3 shows a wagering game network, including both stationary and portable wireless networked wagering game machines. A wagering game network server 301 is coupled via a network such as a wired network 302 or a wireless network to one or more wagering game machines, including stationary wagering game machines such as 303 and portable wireless networked wagering game machines 304. In this example, the portable wireless networked wagering game machines 304 are coupled to the server via a wireless network interface 305, which is attached to the wagering game server 301 via a wired network connection 302.

In more complex embodiments such as in large wagering game establishments, many stationary wagering game machines 303 are likely to be connected to a single server via the network. Similarly, several wireless network interfaces 305 are coupled to the network, to provide wireless network connectivity to a large number of portable wireless networked gaming devices 304 across a wide gaming area within the gaming establishment.

In operation, the wagering game machines either present a wagering game conducted on the server or on another machine, or conduct and present a wagering game to a game player. Presentation of the game on portable wireless networked wagering game machines 304 comprises both presentation of video via the touchscreen displays 101 of FIG. 1, and audio through the speakers 104. The audio presentation is controlled in various embodiments of the invention via an audio module, which in some embodiments is operable to play environmental sounds through the speakers to enhance the audio environment and sense of community for the wagering game player.

In another embodiment of the invention, the audio module is operable to control a variety of audio functions within the portable wireless wagering game machine. The audio module is embodied in software, hardware, or various combinations of hardware or software in different embodiments, and in one example includes an audio codec and related hardware along with a software driver providing an software interface to other software applications.

The audio functions controlled via the audio module include in various embodiments functions such as receiving updated audio files or packages from a server via the wireless network connection, receiving or managing audio configuration via the wireless network, receiving streaming audio or secondary audio programming via the network connection, and managing operation of a microphone and transmission of microphone signals over the wireless network.

Transmission of audio files from a wagering game server 301 to portable wireless networked wagering game machines 304 over the wagering game network 302 and wireless network connection 305 enables the server to refresh the audio files or package used in various embodiments of the wagering game. For example, a wagering game having a fishing theme may have its sound effects, music, spoken or sung audio content, and other such audio content changed periodically to help keep a particular game's audio presentation from becoming repetitive or uninteresting to frequent wagering game players. In some such embodiments, the audio package includes files containing each of these sounds, and the files stored on the portable wireless networked wagering game device are replaced via the wireless network connection. The files are replaced in various embodiments whenever updated audio files become available, after a certain period of time of use of the old audio files has passed, or on a rotating basis such as rotating through the available audio packages for a particular wagering game's audio files daily, weekly, or monthly. The audio files in various embodiments contain audio encoded in any suitable format, such as .wav, .mp3, or other encoded sampled audio; midi or other sequenced audio files; and configuration data including audio information, such as instrument files or audio compression codes.

In another example embodiment, the wagering game network server sends streaming audio data rather than complete audio files to the wagering game machine. The streaming audio comes from a variety of sources and has different content in various embodiments of the invention. In one example, streaming audio comprises background music, audio or television programming, a user-selected audio programming channel, or other such data provided via the wireless network connection. In alternate embodiments, the streaming audio is provided by another mechanism, such as a satellite radio receiver built in to the portable wireless wagering game machine 304, and the audio module is operable to receive and manage the streaming audio receiver such as the satellite radio tuner.

Figure 4:
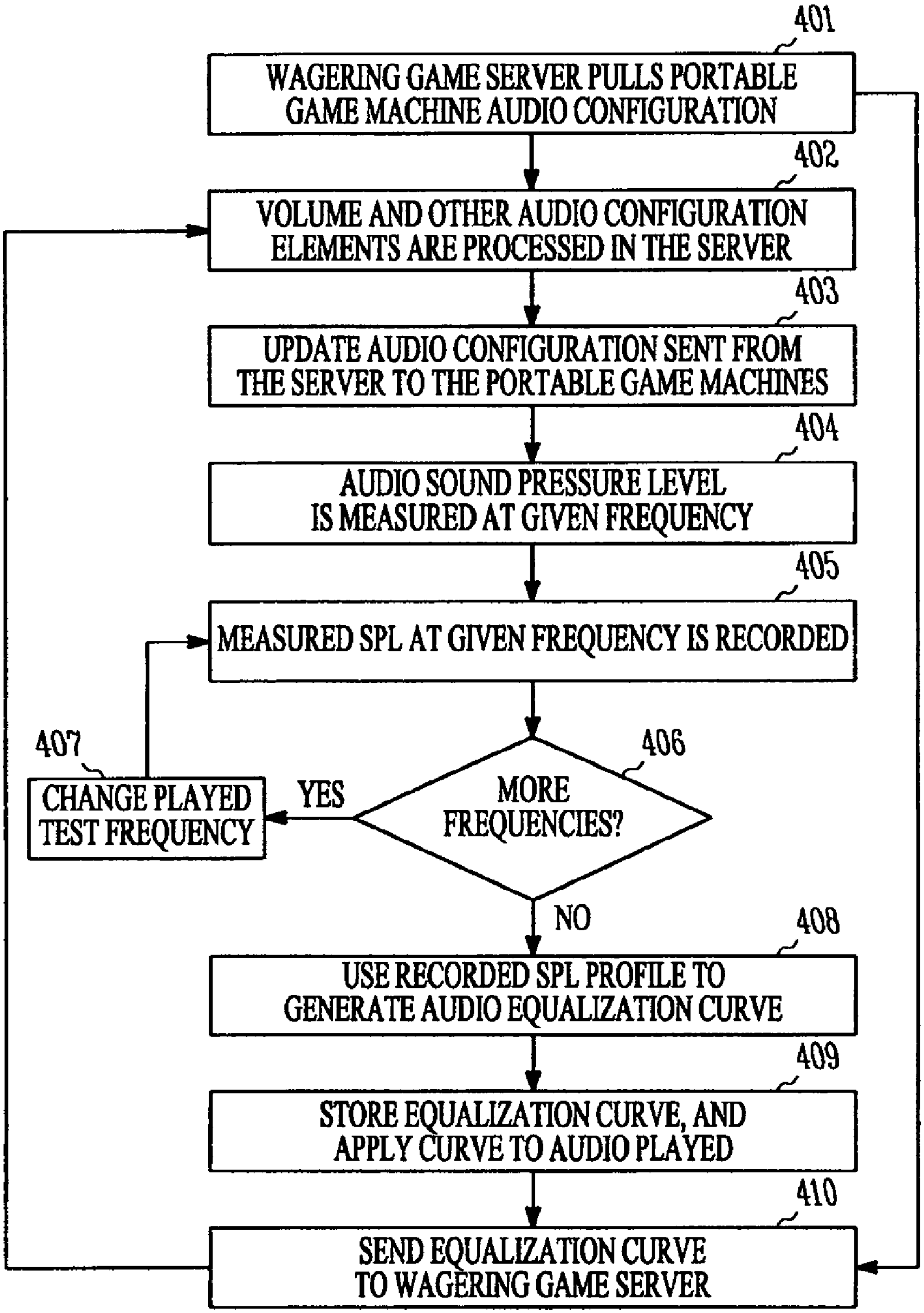
FIG. 4 is a flowchart of a method of managing the equalization and audio configuration of a portable wireless computerized wagering game system, consistent with some example embodiments of the invention.
Figure 5:
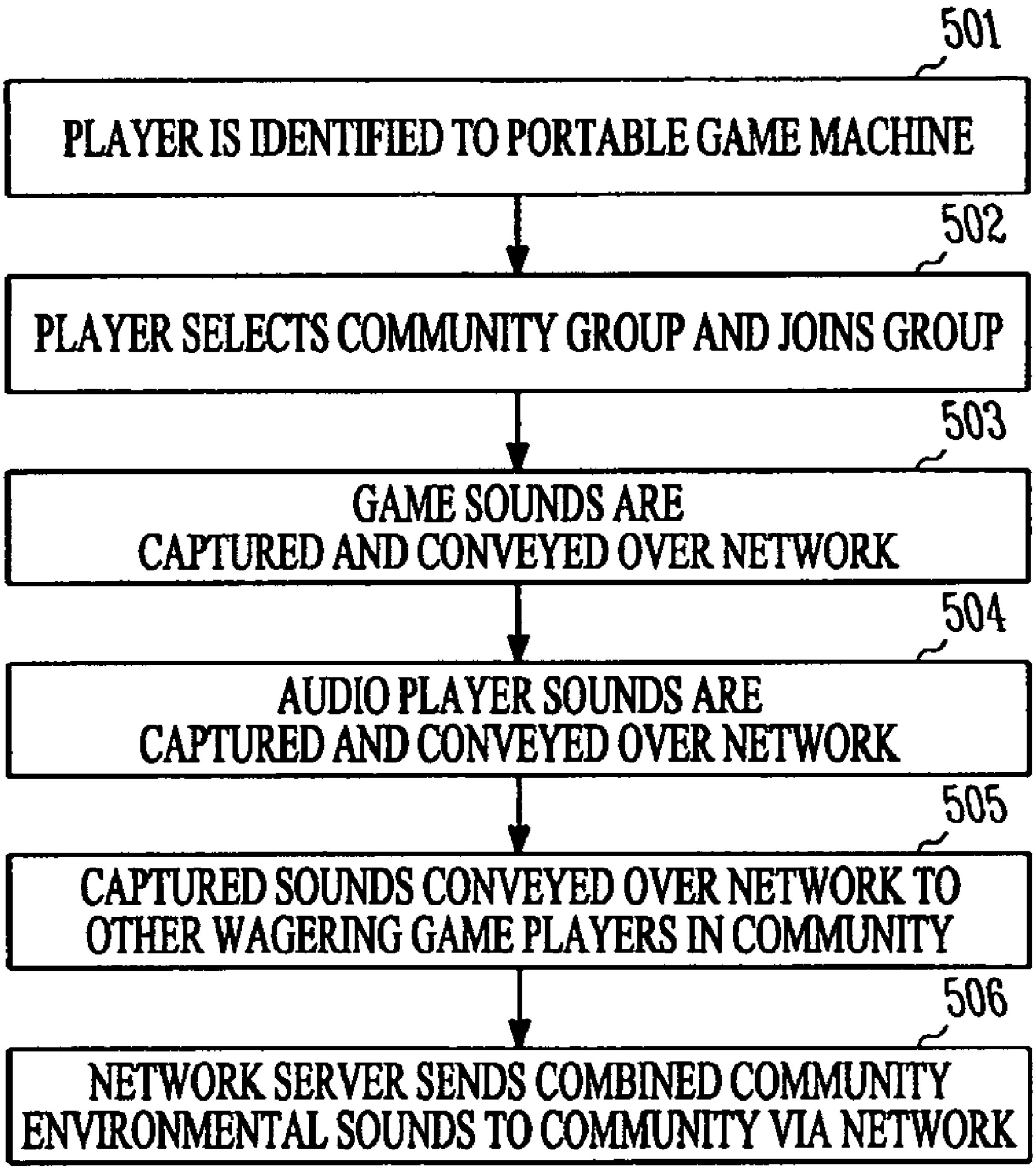
FIG. 5 is a flowchart of a method of sharing audio among a group of wagering game players using portable wireless wagering game machines, consistent with some example embodiments of the invention.

The audio configuration of a portable wireless networked wagering game machine such as that shown at 304 is also managed via the wireless network connection in some embodiments. The audio configuration includes in various embodiments parameters such as volume of one or more audio signals, positional settings, audio files or instrument voices present in the wagering game machine, coder/decoder (codec) configuration, surround sound configuration, and other such audio parameters. A wagering game facility administrator can set these parameters on each of the portable wireless networked wagering game machines via the server 301 and its wireless network connection to the wagering game machines 304. In other embodiments, the portable wireless wagering game systems 304 are operable to report their audio configurations back to the server so that their configurations can be tracked or managed. Such a feature can be used to poll the portable wireless wagering game machines to determine parameters such as an average user's chosen volume, which can then be used to adjust the default volume set as part of the portable wireless wagering game machine's audio configuration FIG. 4 is a flowchart of an example method of managing the audio configuration of a portable wireless networked wagering game machine, consistent with an example embodiment of the invention. At 401, the portable wireless wagering game machine's configuration is polled by a wagering game server via the network connection. The configuration includes information such as the default volume, and the history of user adjustments from the default volume level of the portable wagering game machine. This information is compiled in the wagering game server for one or more portable wireless wagering game machines at 402, and is used to derive an average volume setting. In a further embodiment, the user volume settings are considered along with an ambient noise measurement taken via a microphone in the portable wagering game machine at the time of each volume change, such that a volume profile corresponding to measured ambient noise levels can be compiled at 402 and sent to the portable wagering game machines at 403 as part of the audio configuration. This enables the portable wagering game machines to intelligently adjust in audio volume based on measured ambient noise levels, and ensures that volume changes made as a result of environmental sound changes are appropriate.

The microphone is used in a further configuration setting to adjust the equalization of the audio playback system in the portable wagering game machine, as shown at 404. Here, the microphone, which is in various embodiments contained in the portable wagering game machine, attached to the portable wagering game machine, wirelessly coupled to the wagering game machine, or otherwise able to communicate with the wagering game machine is used to detect the sound pressure generated by playing a given frequency or range of frequencies through the speakers 104 at 404. In one example embodiment, the microphone plugs into a microphone port on the portable wagering game machine, and is removed after audio calibration is complete. In another embodiment, the microphone is a part of the wagering game machine assembly, or is positioned to approximate the frequency response of the audio signals reaching a game player's ear.

A test tone such as a particular frequency, a range of frequencies, filtered noise, or other suitable test tones are played through the speakers 104, and the sound pressure level measured via the microphone is stored at 405. Once the measurement is complete for a given frequency, the audio module determines whether other frequencies remain to be tested at 406. If more frequencies are to be evaluated, the frequency of the test signal is altered at 407 and the process repeats from 404 using the new test frequency. If all frequencies have been evaluated, the recorded sound pressure levels at the various frequencies are used at 408 to produce an equalization curve. The equalization curve is stored at 409, and is applied to audio played back through the portable wagering game machine's speakers to ensure good frequency response.

In an alternate embodiment, white noise, pink noise, an impulse, or another suitable test signal is played through speakers 104 and recorded via the microphone, and the recorded signal is used to generate a frequency response or equalization curve. In one such example, white noise having equal energy at all frequencies is played through the speakers, and the recorded signal is processed such as by application of a fourier transform to reveal the measured audio energy at different frequencies. This measured energy data, along with knowledge of the energy and frequency content of the test signal, can be used to generate a frequency response profile for the speakers, which can in turn be used to derive an equalization curve to provide the audio system with substantially flat frequency response over a broad range of the audible spectrum.

The audio equalization curve is stored at 410, and can be sent to the wagering game server as part of the audio configuration, such as for use in generating estimated frequency response curves for similarly equipped portable wireless wagering game devices at 402 and 403. The various elements shown in the flowchart of FIG. 4 need not be performed in the order given, and need not all be performed in various embodiments of the invention.

The audio module is also operable to manage environmental sounds in some embodiments, such as to play sounds from other wagering game players or other wagering game machines that are a part of a community or environment. The audio environment in various embodiments includes audio sounds produced by the wagering game machines of others, words spoken or sounds made by other wagering game players, and includes configuration of environmental groups and processing of environmental audio such as volume or equalization. The use of environmental audio with portable wireless gaming machines enables game players playing at different locations to share a sense of community in playing a wagering game, such as in a community game, tournament, or among a user-selected group of friends.

In one such embodiment, a user is identified to a wagering game machine such as by logging on or using a player tracking card at 501. The player joins a group at 502, such as by selecting a community game in which other game players participate at least in part, or by selecting a group of people with whom he wishes to form a community. Once the player joins the group, sounds from the player's wagering game are captured via software on the portable wagering game machine at 503 along with capture of sounds the player makes via a microphone at 504. In an alternate embodiment, the microphone used to capture player sounds at 504 is also relied upon to capture sounds presented to the game player as part of wagering game play, and so are not further monitored as is shown at 503. These sounds are conveyed to other wagering game players in the community at 505, so that players within a community can hear one another's voices and hear selected events in other players' wagering games. In one such example, jackpots and other significant events are played not only on the winning game player's portable wagering game machine, but are also played on the wagering game machines of other players in the winning player's community.

In some such embodiments, the winning player is identified with sound, while in other embodiments the winner is not identified or is identified using video graphics. Some such environmental audio sounds are reduced in volume, are equalized, or otherwise processed to make clear that the sounds are environmental sounds and not from a player's own wagering game at 506. In one such example, the volume of environmental game sounds is reduced, and the high frequency content is reduced to provide the audio effect of distance or remoteness.

The captured audio is then sent via the network, such as to a network server where it is mixed with other environmental sounds from the community and distributed to the other portable wireless networked wagering game machines, stationary networked wagering game machines, or other devices within the community at 506. Elements 503-506 continue to operate on an ongoing basis, so that continuous environmental sound is available to the game players in a particular community.

In an alternate embodiment, information representing game events or other audio content is sent via network such that the information can be used to identify and audio sound such as a prerecorded sampled sound, a MIDI instrument, or another designated sound to play, thereby effectively simulating streaming audio while consuming less network bandwidth.

The community comprises in various example embodiments a player-selected group of people, such as a family or group of friends visiting the same wagering game establishment, a group of people in the same geographic area such as in a wireless wagering game hot-spot, or a group of people sharing some characteristic such as playing the same community game or playing in the same tournament. Sharing audio signals within a group enables a group of people in a noisy environment or not in the same location to experience a community atmosphere while gaming, and can enhance the play of tournament or community wagering games.

These examples show how audio management in a portable wireless wagering game machine can be used to enhance the audio experience for wagering game players, including management of audio functions such as receiving updated audio files or packages from a server via the wireless network connection, receiving or managing audio configuration via the wireless network, receiving streaming audio, audio information, or secondary audio programming via the network connection, and managing operation of a microphone and transmission of microphone signals over the wireless network. In other embodiments, sounds are shared via the network with other wagering game players who are part of a community or group, such as a community game, tournament, or self-selected group of wagering game players.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A wireless networked computerized wagering game system configured to provide communications between a plurality of gaming machines that are connected to a communications network, the system comprising:

a gaming module operable to present one or more wagering games on which monetary value can be wagered;

a wireless network module operable to connect the wagering game system to a wagering game server via a wireless network connection to the communications network;

an audio environment module;

one or more processors; and at least one memory device storing at least the gaming, wireless network, and audio environment modules, the modules, when executed by the one or more processors, causing the one or more processors to operate with the modules and the wagering game server to:

receive selected audio sounds that are produced as part of at least one wagering game being played on one or more first gaming machines of the plurality of gaming machines;

process the selected audio sounds into audibly modified sounds that, when played to a player at a second gaming machine of the plurality, are readily identifiable as being produced by the first gaming machines and not the second gaming machine; and play the modified sounds for the player at the second gaming machine.

2. The wireless networked computerized wagering game system of claim 1, wherein the audibly modified sounds further comprise voices of one or more wagering game players.

3. The wireless networked computerized wagering game system of claim 1, wherein the audio environment module resides on the wagering game server.

4. The wireless networked computerized wagering game system of claim 1, wherein the audibly modified sounds further comprise an audio program unrelated to the wagering game being presented.

5. The wireless networked computerized wagering game system of claim 1, wherein the audibly modified sounds comprise sounds from an identified group of users.

6. The wireless networked computerized wagering game system of claim 5, wherein the identified group of users comprises at least one of players of a community game, players within a certain physical area, players in a tournament, or members of a player-determined group.

7. The wireless networked computerized wagering game system of claim 1, wherein the audibly modified sounds are played using at least one of a reduced volume and a changed frequency response.

8. A method of operating a wireless networked computerized wagering game system, the game system including a plurality of networked gaming machines playing one or more wagering games on which monetary value can be wagered, the method comprising:

connecting the wagering game system to a wagering game server via a wireless network connection to a communications network;

receiving, via the communications network, selected audio sounds that are produced as part of at least one wagering game being played on one or more first gaming machines;

processing, via one or more processors, the selected audio sounds into audibly modified sounds that, when played to a player at a second gaming machine of the plurality, are readily identifiable as being produced by the first gaming machines and not the second gaming machine; and playing the audibly modified sounds for the player at the second gaming machine.

9. The method of operating a wireless networked computerized wagering game system of claim 8, wherein the audibly modified sounds further comprise voices of one or more wagering game players.

10. The method of operating a wireless networked computerized wagering game system of claim 8, wherein the one or more processors reside on the wagering game server.

11. The method of operating a wireless networked computerized wagering game system of claim 8, wherein the audibly modified sounds further comprise an audio program unrelated to the at least one wagering game being played.

12. The method of operating a wireless networked computerized wagering game system of claim 8, wherein the audibly modified sounds comprise sounds from an identified group of users.

13. The method of operating a wireless networked computerized wagering game system of claim 12, wherein the identified group of users comprises at least one of players of a community game, players within a certain physical area, players in a tournament, or members of a player-determined group.

14. The method of operating a wireless networked computerized wagering game system of claim 8, wherein the audibly modified sounds are played using at least one of a reduced volume, a separate user-controllable volume, and a changed frequency response.

15. A machine-readable, non-transitory medium with instructions stored thereon, the instructions, when executed by one or more processors, causing a computerized wagering game system to:

connect the wagering game system to a plurality of gaming machines and a wagering game server via a wireless network connection, wherein the wagering game server and the plurality of gaming machines are communicably connected to a communications network, and the plurality of gaming machines are playing one or more wagering games; and receive selected audio sounds that are produced as part of at least one wagering game being played on one or more first gaming machines;

process the selected audio sounds into audibly modified sounds that, when played to a player at a second gaming machine of the plurality, are readily identifiable as being produced by the first gaming machines and not the second gaming machine; and play the audibly modified sounds for the player at the second gaming machine.

16. The machine-readable medium of claim 15, wherein the audibly modified sounds further comprise voices of one or more other wagering game players.

17. The machine-readable medium of claim 15, wherein the medium resides on the wagering game server.

18. The machine-readable medium of claim 15, wherein the audibly modified sounds further comprise an audio program unrelated to the wagering game being presented.

19. The machine-readable medium of claim 15, wherein the audibly modified sounds further comprise sounds from an identified group of users.

20. The machine-readable medium of claim 19, wherein the identified group of users comprises at least one of players of a community game, players within a certain physical area, players in a tournament, or members of a player-determined group.

21. The machine-readable medium of claim 15, wherein the audibly modified are played using at least one of a reduced volume, a separate user-controllable volume, and a changed frequency response.

22. A networked computerized wagering game system server, comprising:

a network module operable to connect the wagering game system server to a plurality of gaming machines playing one or more wagering games via a wireless network connection to a communications network;

an audio environment module;

one or more processors; and at least one memory device storing instructions including the audio environment module and the network module that, when executed by the one or more processors, cause the wagering game system server to operate with the plurality of gaming machines to:

receive selected audio sounds that are produced as part of at least one wagering game being played on one or more first gaming machines of the plurality;

process the selected audio sounds into audibly modified sounds that, when played to a player at a second gaming machine of the plurality, are readily identifiable as being produced by the first gaming machines and not the second gaming machine; and send the audibly modified sounds to at least the second gaming machine for playing to the player.

* * * * *

UNITED STATES PATENT AND TRADEMARK OFFICE
CERTIFICATE OF CORRECTION

| | | | |
|---|---|---|---|
| PATENT NO. | : | 8,403,750 B2 | Page 1 of 1 |
| APPLICATION NO. | : | 12/298085 | |
| DATED | : | March 26, 2013 | |
| INVENTOR(S) | : | Bone et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this
First Day of September, 2015

Michelle K. Lee

Michelle K. Lee
*Director of the United States Patent and Trademark Office*